United States Patent [19]

Nakamura et al.

[11] Patent Number: 5,183,863

[45] Date of Patent: Feb. 2, 1993

[54] VISCOELASTIC RESIN COMPOSITION FOR VIBRATION-DAMPING MATERIAL

[75] Inventors: Masanori Nakamura; Hiroshi Hirakouchi; Takeshi Yatsuka, all of Shiga; Nobuo Kadowaki; Hiroshi Endoh, both of Chiba, all of Japan

[73] Assignees: Toyo Boseki Kabushiki Kaisha, Osaka; Nippon Steel Corporation, Tokyo, both of Japan

[21] Appl. No.: 890,116

[22] Filed: May 29, 1992

[30] Foreign Application Priority Data

May 31, 1991 [JP] Japan .................. 3-157643

[51] Int. Cl.$^5$ .............................. C08G 18/42
[52] U.S. Cl. .................. 525/438; 525/440; 525/444; 528/51; 528/81; 528/83; 528/89; 528/112; 528/115; 528/286; 528/296; 528/297; 528/304; 528/308
[58] Field of Search ............ 525/438, 440, 444; 528/51, 81, 83, 89, 112, 115, 286, 296, 297, 304, 308

[56] References Cited

U.S. PATENT DOCUMENTS 4,937,307 6/1990 Chung ..................... 528/83

Primary Examiner—Maurice J. Welsh
Attorney, Agent, or Firm—Wegner, Cantor, Mueller & Player

[57] ABSTRACT

Disclosed herein is a viscoelastic resin composition for vibration-damping material which comprises (A) at least one amorphous polyester resin of low specific gravity in which more than 40 mol % of the dibasic acid moiety is of aromatic type, (B) at least one amorphous polyester resin of high specific gravity in which more than 80 mol % of the dibasic acid moiety is of aromatic type, and (C) at least one hardener selected from the group consisting of polyisocyanate compounds, epoxy group-containing compounds, and acid anhydrides, said consitutents (A) and (B) being in the ratio of from 90:10 to 30:70 by weight and differing from each other in specific gravity (at 30° C.) by 0.06 to 0.15 and also in molecular weight by more than 10000, with that of either of them being higher than 5000. This resin composition gives a vibration-damping material which exhibits improved vibration-damping properties, adhesive strength, formability, and heat resistance after forming.

11 Claims, No Drawings

VISCOELASTIC RESIN COMPOSITION FOR VIBRATION-DAMPING MATERIAL

BACKGROUND OF THE INVENTION

1. Field of the Invention

The present invention relates to a viscoelastic resin composition for vibration damping material and more particularly to a viscoelastic resin composition for vibration-damping material to form an intermediate layer in the laminate structural member of machines, buildings, and vehicles.

2. Description of the Prior Art

In these days of well-developed traffic facilities and disordered urban environments where dwelling houses are close to factories, noise and vibration constitute a social problem as public nuisance. Noise and vibration also aggravate the working environment. Attempts are being made to reduce noise and vibration by providing the metal material as a source of noise and vibration with the vibration-damping function to absorb vibration energy and convert it into thermal energy, thereby damping the vibration velocity or vibration amplitude and reducing the acoustic radiation.

To improve the vibration-damping function, there has been proposed a composite vibration-damping material of laminate structure which is composed of metal layers and a viscoelastic intermediate layer interposed between them. It is now in use as a structural member for automotive engine cover and oil pan, hopper chute, conveyor stopper, household electric appliance, metal working machine, and precision machine, which are required to generate as little vibration as possible.

In general, the composite vibration-damping material mentioned above depends for its performance on the viscoelastic intermediate layer. The vibration-damping performance is expressed in terms of loss factor (which indicates a degree of conversion of external vibration energy into thermal energy by internal friction, or an amount of mechanical hysteresis loss caused by vibration). The loss factor has a peak value at a certain temperature, and the vibration-damping material can be used most effectively in the neighborhood of that temperature.

According to the known prior art technology, the conventional composite vibration-damping material has a viscoelastic intermediate layer which is made of polyester alone (*1), polyester incorporated with a plasticizer (*2), polyester incorporated with an organic peroxide (*3, 4), a plurality of polyesters in combination (*5, *6), polyurethane foam alone (*7), polyamide alone (*8), ethylene-vinyl acetate copolymer (*9), polyvinyl butyral or polyvinyl butyral-polyvinyl acetate composition incorporated with a plasticizer and tackifier (*10), copolymer of isocyanate prepolymer and vinyl monomer (*11), or a specific copolymer (*12, *13, *14).

*1 Japanese Patent Kokai No. 143880/1975
*2 Japanese Patent Kokai No. 93770/1976
*3 Japanese Patent Kokai No. 41080/1976
*4 Japanese Patent Kokai No. 83640/1976
*5 Japanese Patent Kokai No. 295949/1987
*6 Japanese Patent Kokai No. 202446/1988
*7 Japanese Patent Kokai No. 91981/1976
*8 Japanese Patent Kokai No. 159160/1981
*9 Japanese Patent Kokai No. 34949/1982
*10 Japanese Patent Kokai No. 27975/1980
*11 Japanese Patent Publication No. 27975/1980
*12 Japanese Patent Kokai No. 258262/1985
*13 Japanese Patent Publication No. 12451/1964
*14 Japanese Patent Publication No. 34703/1970

The composite vibration-damping material is required to have a high loss factor and a high adhesive strength between the viscoelastic intermediate layer and the metal layer. However, these requirements have not been fully satisfied. For example, vibration-damping performance and adhesive strength do not consist together at room temperature in the case where the viscoelastic intermediate layer is made of polyester resin (as in Japanese Patent Kokai Nos. 143880/1975, 93770/1976, 41080/1976, and 83640/1976), or even in the case where the viscoelastic intermediate layer is made of a plurality of polyesters in combination (which differ in glass transition point) so that it produces its vibration-damping effect over a broad range of temperature (as in Japanese Patent Kokai Nos. 295949/1987 and 202446/1988).

Moreover, the composite vibration-damping material having a viscoelastic intermediate layer should be capable of fabrication such as pressing and bending. However, conventional ones do not meet this requirement; they are liable to wrinkling and cracking during fabrication and also to peeling between the viscoelastic intermediate layer and the metal layer during heat treatment (such as baking finish) which follows fabrication.

SUMMARY OF THE INVENTION

The present invention was completed to address the above-mentioned problems. It is an object of the present invention to provide a viscoelastic resin composition for vibration-damping material having improved performance, adhesive strength, formability, and heat resistance.

The present invention is embodied in a viscoelastic resin composition for vibration-damping material which comprises (A) at least one amorphous polyester resin of low specific gravity in which more than 40 mol % of the dibasic acid moiety is of aromatic type, (B) at least one amorphous polyester resin of high specific gravity in which more than 80 mol% of the dibasic acid moiety is of aromatic type, and (C) at least one hardener selected from the group consisting of polyisocyanate compounds, epoxy group-containing compounds, and acid anhydrides, said constituents (A) and (B) being in the ratio of from 90:10 to 30:70 by weight and differing from each other in specific gravity (at 30° C.) by 0.06 to 0.15 and also in molecular weight by more than 10000, with that of either of them being higher than 5000.

DETAILED DESCRIPTION OF THE INVENTION

The present invention requires that the viscoelastic resin composition be composed of two or more polyester resins which differ from one another in molecular weight by more than 10000 and in specific gravity by 0.06–0.15. The polyester resins meeting these requirements form the microphase separation structure but do not undergo complete phase separation. This leads to their superior vibration-damping performance (over a broad range of temperature), adhesion, and formability. In addition, upon heat curing, they exhibit improved adhesive strength and heat resistance after forming.

The polyester resins are formed from dibasic acids and glycols. The dibasic acids include aromatic dicarboxylic acids (such as terephthalic acid, isophthalic acid, orthophthalic acid, 1,5-naphthalenedicarboxylic acid, 2,6-naphthalenedicarboxylic acid, 4,4'-biphenyldicarboxylic acid, 2,2,-biphenyldicarboxylic acid, and 5-sodium sulfoisophthalic acid), alicyclic dicarboxylic acids (such as 1,4-cyclohexanedicarboxylic acid, 1,3- cyclohexanedicarboxylic acid, and 1,2-cyclohexanedicarboxylic acid), and aliphatic dicarboxylic acids (such as succinic acid, adipic acid, azelaic acid, sebacic acid, dodecanedicarboxylic acid, and dimer acid). These dibasic acids may be used in combination with tribasic acids (such as trimellitic acid and pyromellitic acid) in amounts harmless to the resin properties.

The glycols are exemplified by aliphatic glycols (such as ethylene glycol, propylene glycol, 1,4-butanediol, 1,3-butanediol, 1,5-pentanediol, neopentyl glycol, 3-methylpentanediol, 1,6-hexanediol, trimethylpentanediol, 1,9-nonanediol, 2-methyl-1,8-octanediol, 2,2,-diethyl-1,3-propanediol, 2-ethyl-2-butyl-1,3-propanediol, diethylene glycol, and triethylene glycol), alicyclic diols (such as 1,4-cyclohexane dimethanol), and aromatic ring-containing diols (such as adduct of bisphenol A or bisphenol S with ethylene oxide or propylene oxide). These glycols may be used in combination with trifunctional or multifunctional components such as trimethylolpropane, glycerin, and pentaerythritol in amounts harmless to the resin properties.

The polyester resins may employ as their constituents hydroxycarboxylic acids (such as hydroxybenzoic acid and p-(2-hydroxyethoxy)benzoic acid) or cyclic ester compounds (such as ε-caprolactone and δ-valerolactone).

According to the present invention, the viscoelastic resin composition employs two kinds of polyester resins, (A) one in which more than 40 mol% of the dibasic acid moiety is of aromatic type and (B) another in which more than 80 mol% of the dibasic acid moiety is of aromatic type. With a less amount of aromatic dicarboxylic acids than specified above, the polyester resins are poor in cohesive force and hence in adhesive strength.

According to the present invention, it is essential that the two polyester resins differ from each other in number-average molecular weight by at least 10000, preferably by more than 12000, and also in specific gravity (at 30° C.) by 0.06–0.15, preferably by 0.08–0.125. Owing to this difference in molecular weight and specific gravity, the two polyester resins form the microphase separation structure, and consequently the viscoelastic resin composition of the present invention is not liable to phase separation when dissolved in an organic solvent and the phase separation which might occur after long storage can be easily eliminated by simple stirring. If the difference in molecular weight and specific gravity is outside the above-specified range, the two polyester resins would mix uniformly with each other or separate into two phases completely in the viscoelastic resin composition. The former case leads to unsatisfactory improvements in vibration-damping performance, adhesive strength, formability, and heat resistance after forming. The latter case has adverse effects on mechanical strength, adhesive strength, formability, and heat resistance after forming.

According to the present invention, one of the two polyester resins should have a number-average molecular weight higher than 5000, preferably higher than 7000, which is lower than that of the other. If this condition is not satisfied, the resin composition will be poor in adhesive force and formability.

According to the present invention, the two polyester resins, one having a low specific gravity and the other having a high specific gravity, should be mixed with each other in a ratio of from 90:10 to 30:70, preferably from 85:15 to 50:50. If the amount of the latter is less than specified above, the combination of the two polyester resins does not produce the desired effect. In the opposite case, there occurs an unstable microphase separation structure which lessens the effect of the invention.

According to the present invention, the polyester resins should be amorphous ones which do not give a definite melting point when heated at a rate of 10° C. per minute using a differential scanning calorimeter. Crystalline polyester resins are poor in vibration-damping performance and formability.

According to the present invention, the polyester resins should be mixed with at least one hardener selected from the group consisting of polyisocyanate compounds, epoxy group-containing compounds, and acid anhydrides, so that they are cured upon heating. The thermally cured polyester resins exhibit improved adhesive strength, formability, heat resistance after forming, and hydrolysis resistance (which leads to the improved durability of the composite vibration-damping material). The polyisocyanate compounds include aliphatic, alicyclic, and aromatic ones which have the functionality of two or higher. Those having the functionality of three or higher are desirable from the view point of volatility, adhesion, and durability. The epoxy group-containing compounds include those which have two or more glycidyl groups per molecule, such as epi-bis type epoxy resin, aliphatic epoxy resin, glycidyl ester resin, glycidylamine resin, glycidyl ether resin, and novolak type epoxy resin. The acid anhydrides include aliphatic ones, alicyclic ones, and aromatic ones, of which those having two or more acid anhydride groups per molecule are desirable.

According to the present invention, the polyester resins are incorporated with the above-mentioned hardeners which are used alone (e.g., polyisocyanate compound) or in combination with one another (e.g., polyisocyanate compound plus epoxy resin, epoxy resin plus acid anhydride, and epoxy resin plus acid anhydride plus polyisocyanate compound).

In the case where the hardener is a combination of epoxy resin and acid anhydride, the polyester resins react with it faster if their terminal functional groups are carboxyl groups than if they are hydroxyl groups. The faster reactivity leads to the improved adhesion and durability. It is desirable from the view point of formability and heat resistance after forming that at least either of the polyester resin of low specific gravity and the polyester resin of high specific gravity has an acid value greater than 25 equivalents, more preferably greater than 50 equivalents per ton.

Further, it is preferable that the average acid value of the whole polyester resins is 25 equivalents or larger per ton.

The amount of the harder varies preferably from 5 to 50 parts by weight for 100 parts by weight of the polyester resins in total, depending on the kind of the polyester resins used and the characteristic properties required of the composite vibration-damping material.

The viscoelastic resin composition may be incorporated with any one or more of fiber (such as glass fiber, polyester fiber, and carbon fiber) and particulate matter (such as calcium carbonate and magnesium carbonate) for reinforcement, metal powder and fiber (of stainless steel, nickel, aluminum, etc.) and electrically conductive particles (of carbon black, graphite, etc.) to impart spot weldability, coupling agents to increase adhesion between the resin and the inorganic matter, leveling agents to improve coating properties, and antioxidants (of phenol type and hindered amine type) to heighten heat resistance.

To form a vibration-damping material of laminate structure, the above-mentioned viscoelastic resin composition is sandwiched between metal plates of steel, aluminum, copper, or brass. Three or more metal plates may be used, and metal plates of different kinds may be combined with one another.

To produce a composite vibration-damping material, the viscoelastic resin composition is dissolved in an organic solvent, the resulting solution is applied to metal plates, and after drying, the coated metal plates are bonded together by hot pressing.

EXAMPLES

The invention will be explained in more detail with reference to the following examples, in which "parts" means "parts by weight".

Table 1 shows the composition and characteristic properties of the polyester resins used in Examples and Comparative Examples. Each polyester resin was prepared in the usual way by the esterification and polycondensation at 260° C. under reduced pressure (0.1 mmHg) catalyzed by tetrabutyl titanate. Incidentally, the production of polyester resins Nos. 2, 3, 4, and 7 involved the addition of ε-caprolactone which was performed at 210° C. after the polycondensation, with the atmosphere restored to normal pressure by the introduction of nitrogen. The production of polyester resins Nos. 5, 6, 9, and 10 involved the addition of a carboxylic acid (trimellitic acid) to the terminal group at 220° C. after the polycondensation, with the atmosphere restored to normal pressure by the introduction of nitrogen.

The resulting composite vibration-damping material was evaluated for the following items.

(1) Adhesion properties

Adhesion properties were tested by measuring the adhesive strength under shear of a lapped part (25×10 mm) and also by measuring the T-peel strength of a 25-mm wide specimen at a pull speed of 50 mm/min at 20° C. The measurements were carried out before and after the specimens were heated at 200° C. for 30 minutes. This heat treatment simulates the coating process.

(2) Vibration-damping properties

Vibration-damping properties were tested by measuring the damping factor ($\eta$) of a laminated steel sheet (30×300 mm), as a test piece, at varied temperatures and 500 Hz according to the mechanical impedance method. The greater the damping factor, the better the vibration-damping properties.

(3) Formability

A laminated steel sheet (300×300 mm) as a test piece was formed into a cylinder (100 mm in diameter and 150 mm deep) by deep draw forming using a press machine. The cylinder was ultrasonically checked before and after heating at 200° C. for 30 minutes to see if peeling occurred in the sidewall. Formability was rated in terms of the peeled area as follows:

Good peeled area less than 10%
Fair : peeled area from 10 to 50%
Poor : peeled area more than 50%

TABLE 1

| | Composition and characteristic properties of polyester resins | | | | | |
|---|---|---|---|---|---|---|
| Polyester resin | Composition (molar ratio) | Molecular weight | Specific gravity | Crystallinity | Acid value (eq/T) | Tg (°C.) |
| 1 | T/I/Az/TMA//EG/NPG 30/18.5/50/1.5//50/50 | 31000 | 1.175 | Amorphous | 28 | −18 |
| 2 | T/AA/TMA//EG/NPG--CL 50/48.5/1.5//50/50--140 | 27000 | 1.160 | Amorphous | 31 | −33 |
| 3 | T/I//MPD--CL 50/50//100--120 | 25000 | 1.175 | Amorphous | 18 | −22 |
| 4 | T/I/TMA//EG/NPG--CL 50/48/2//50/50--150 | 29000 | 1.190 | Amorphous | 25 | −17 |
| 5 | T/I/Az//EG/DMH//TMA 40/25/35//50/50//1 | 24000 | 1.120 | Amorphous | 110 | −25 |
| 6 | T/I/Az//EG/DMH//TMA 20/15/65//25/75//1 | 25000 | 1.095 | Amorphous | 120 | −34 |
| 7 | T/I//EG/BD--CL 60/40//25/75--140 | 32000 | 1.240 | Crystalline | 28 | −15 |
| 8 | T/I//AA//EG/NPG 30/25/45//70/30 | 35000 | 1.235 | Amorphous | 34 | −15 |
| 9 | T/I//EG/BPE//TMA 50/50//25/75//1 | 12000 | 1.260 | Amorphous | 100 | 68 |
| 10 | T/I//EG/BPE//TMA 50/50//25/75//1 | 4500 | 1.255 | Amorphous | 110 | 59 |
| 11 | T/I//EG/NPG/CHDM 30/70//30/40/30 | 8500 | 1.245 | Amorphous | 8 | 68 |
| 12 | T/I//EG/NPG 50/50//50/50 | 19000 | 1.262 | Amorphous | 25 | 68 |

Note to Table1 1 (Abbreviations of raw materials)
T: Terephthalic acid
I: Isophthalic acid
Az: Azelaic acid
AA: Adipic acid
TMA: Trimellitic acid
CL: ε-Caprolactone
EG: Ethylene glycol
NPG: Neopentyl glycol
MPD: 3-Methyl-1,5-pentanediol
DMH: 2-Ethyl-2-butyl-1,3-propanediol
BD: 1,4-butanediol
BPE: Adduct of bisphenol A with ethylene oxide (with a molecular weight of 320)
CHDM: 1,4-cyclohexanedimethanol

EXAMPLES 1 TO 7 AND COMPARATIVE EXAMPLES 1 TO 8

In a 1:1 mixed solvent of cyclohexanone and xylene were dissolved 70 pars of the polyester resin (No. 1) and 30 parts of the polyester resin (No. 9) shown in Table 1, so as to give a solution containing 35% solids. This In Comparative Examples 1 to 5, the two polyester resins differ in specific gravity by a value outside the claimed range. In Comparative Example 6, one of the two polyester resins has a molecular weight smaller than 5000. In Comparative Examples 7 and 8, the two polyester resins are combined in a ratio outside the claimed range.

TABLE 2

| | | Performance of laminates | | | | | | |
|---|---|---|---|---|---|---|---|---|
| | | Example 1 | Example 2 | Example 3 | Example 4 | Example 5 | Example 6 | Example 7 |
| Viscoelastic layer | Polyester | 1/9 = 70/30 | 2/9 = 80/20 | 2/9 = 60/40 | 3/9 = 70/30 | 4/12 = 70/30 | 5/9 = 70/30 | 6/11 = 70/30 |
| | Hardener | BTDA + YD8125 | BTDA + YD8125 | BTDA + YD8125 | BTDA + YD8125 | BTDA + YD8125 | Colonate-L 10 parts | Colonate-L 10 parts |
| Shear strength | Before heat treatment | 140 | 155 | 165 | 150 | 165 | 125 | 125 |
| | After heat treatment | 150 | 150 | 160 | 150 | 160 | 120 | 115 |
| Vibration-damping properties | 10° C. | 0.09 | 0.21 | 0.12 | 0.15 | 0.07 | 0.24 | 0.27 |
| | 30° C. | 0.18 | 0.39 | 0.31 | 0.26 | 0.31 | 0.35 | 0.47 |
| | 50° C. | 0.27 | 0.18 | 0.27 | 0.32 | 0.43 | 0.37 | 0.32 |
| | 70° C. | 0.34 | 0.09 | 0.31 | 0.12 | 0.21 | 0.28 | 0.12 |
| Formability | Before heat treatment | good | good | good | good | good | good | good |
| | After heat treatment | good | good | good | good | good | good | good |

TABLE 3

| | | Performance of laminates | | | | | | | |
|---|---|---|---|---|---|---|---|---|---|
| | | Comparative Example 1 | Comparative Example 2 | Comparative Example 3 | Comparative Example 4 | Comparative Example 5 | Comparative Example 6 | Comparative Example 7 | Comparative Example 8 |
| Viscoelastic layer | Polyester | 6/9 = 70/30 | 7/11 = 70/30 | 8/12 = 70/30 | 8/12 = 70/30 | 6/12 = 70/30 | 1/10 = 70/30 | 1/9 = 95/5 | 1/9 = 20/80 |
| | Hardener | BTDA + YD8125 | BTDA + YD8125 | BTDA + YD8125 | Colonate-L 10 parts | BTDA + YD8125 | BTDA + YD8125 | BTDA + YD8125 | BTDA + YD8125 |
| Shear strength | Before heat treatment | 20 | 50 | 140 | 100 | 20 | 80 | 85 | 160 |
| | After heat treatment | 35 | peeled | 135 | 80 | 30 | 70 | 75 | 165 |
| Vibration-damping properties | 10° C. | 0.33 | 0.02 | 0.02 | 0.02 | 0.35 | 0.08 | 0.34 | 0.002 |
| | 30° C. | 0.18 | 0.03 | 0.24 | 0.20 | 0.21 | 0.12 | 0.29 | 0.004 |
| | 50° C. | 0.08 | 0.02 | 0.31 | 0.31 | 0.06 | 0.16 | 0.02 | 0.06 |
| | 70° C. | 0.11 | 0.01 | 0.04 | 0.03 | 0.13 | 0.22 | 0.01 | 0.21 |
| Formability | Before heat treatment | poor | poor | good | good | poor | good | good | good |
| | After heat treatment | poor | poor | poor | poor | poor | poor | poor | poor | solution was incorporated with 4 parts of benzophenonetetracarboxylic acid dianhydride (BTDA) as an acid anhydride, 20 parts of epi-bis type epoxy resin ("Epo Tohto YD8125" made by Tohto Kasei Co., Ltd.) as an epoxy resin, and 0.3 part of triphenylphosphine as a catalyst for the epoxy ring opening reaction. The resulting composition was applied to a 0.5 mm thick phosphate-treated steel sheet in such a manner that the coating thickness after drying was 25 μm. After drying by hot air at 180° C. for 2 minutes, two pieces of the coated steel sheets were bonded together by pressing at 180° C. for 30 seconds, with the coating films facing each other. The thus obtained laminate gave the results of evaluation as shown in Table 2.

In a similar manner, laminates were prepared from the polyester resins and hardeners shown in Tables 2 and 3. The results of evaluation are shown in Table 2. Incidentally, BTDA and YD8125 (as hardeners) were used in amounts of 4 parts and 20 parts, respectively, for 100 parts of all the polyester resins. "Colonate-L" as a hardener is a polyisocyanate compound made by Nippon Polyurethane Co., Ltd.

It is noted from the foregoing that the viscoelastic resin composition of the present invention can be applied to vibration-damping materials of laminate structure which exhibit not only outstanding vibration-damping properties and adhesive strength over a broad range of temperature but also outstanding formability and heat resistance. It is thought that these effects are due to the microphase separation structure which results from using two polyester resins each having a specific range of characteristic properties.

What we claim is:

1. A viscoelastic resin composition for a vibration damping material comprising (A) at least one low specific gravity amorphous polyester resins wherein 40 mol % or more of the dibasic acid component is an aromatic dicarboxylic acid, (B) at least one high specific gravity amorphous polyester resins wherein 80 mol % or more of the dibasic acid component is an aromatic dicarboxylic acid and (C) at least one hardener selected from the group consisting of polyisocyanate compounds, epoxy group-containing compounds and acid anhydrides, characterized in that the difference in molecular weight between (A) and (B) is 10,000 or more, the molecular weight of one of (A) and (B) is 5,000 or higher, the difference in specific gravity at 30° C. between (A) and (B) is within the range of 0.06–0.15, and the weight ration (A):(B) is within the range of 90:10–30:70.

2. A composition as claimed in claim 1 wherein the acid value of at least one of the low specific gravity amorphous polyester resin and high specific gravity amorphous polyester resin is 25 equivalents or more per ton of the resin.

3. A composition as claimed in claim 1 wherein the difference in specific gravity between the low specific gravity amorphous polyester resin and high specific gravity amorphous polyester resin is within the range from 0.07 to 0.15.

4. A composition as claimed in claim 3 wherein the said difference in specific gravity is within the range from 0.08 to 0.125.

5. A composition as claimed in claim 1 wherein the molecular weight of either one of the low specific gravity amorphous polyester resin and the high specific gravity amorphous polyester resin is 7,000 or higher.

6. A composition as claimed in claim 1 wherein the weight ratio of the (A) low specific gravity amorphous polyester resin and (B) high specific gravity amorphous polyester resin, i.e. (A):(B), is 85:15–50:50.

7. A composition as claimed in claim 2 wherein the hardener comprises an epoxy group-containing compound and acid anhydride.

8. A composition as claimed in claim 7 wherein the amount of the hardener is 5–50 parts by weight per 100 parts by weight of the total polyester resin.

9. A composition as claimed in claim 8 wherein the acid anhydride contains two acid anhydride groups in one molecule.

10. A composition as claimed in claim 7 wherein the hardener further contains a phosphorus compound as a catalyst for epoxy ring opening reaction.

11. A composition as claimed in claim 10 wherein the phosphorus compound is a tertiary phosphine.

* * * * *